UNITED STATES PATENT OFFICE.

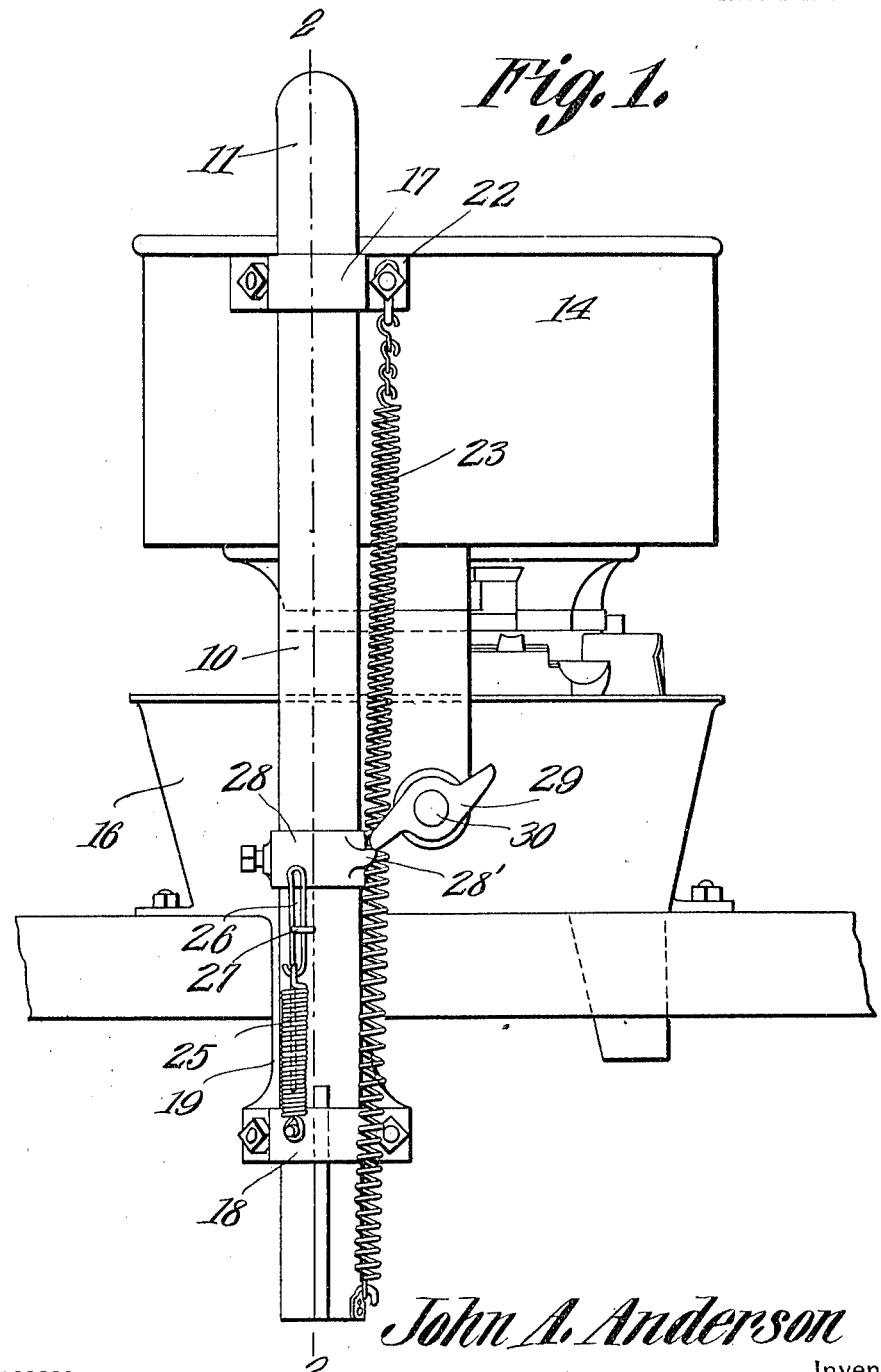

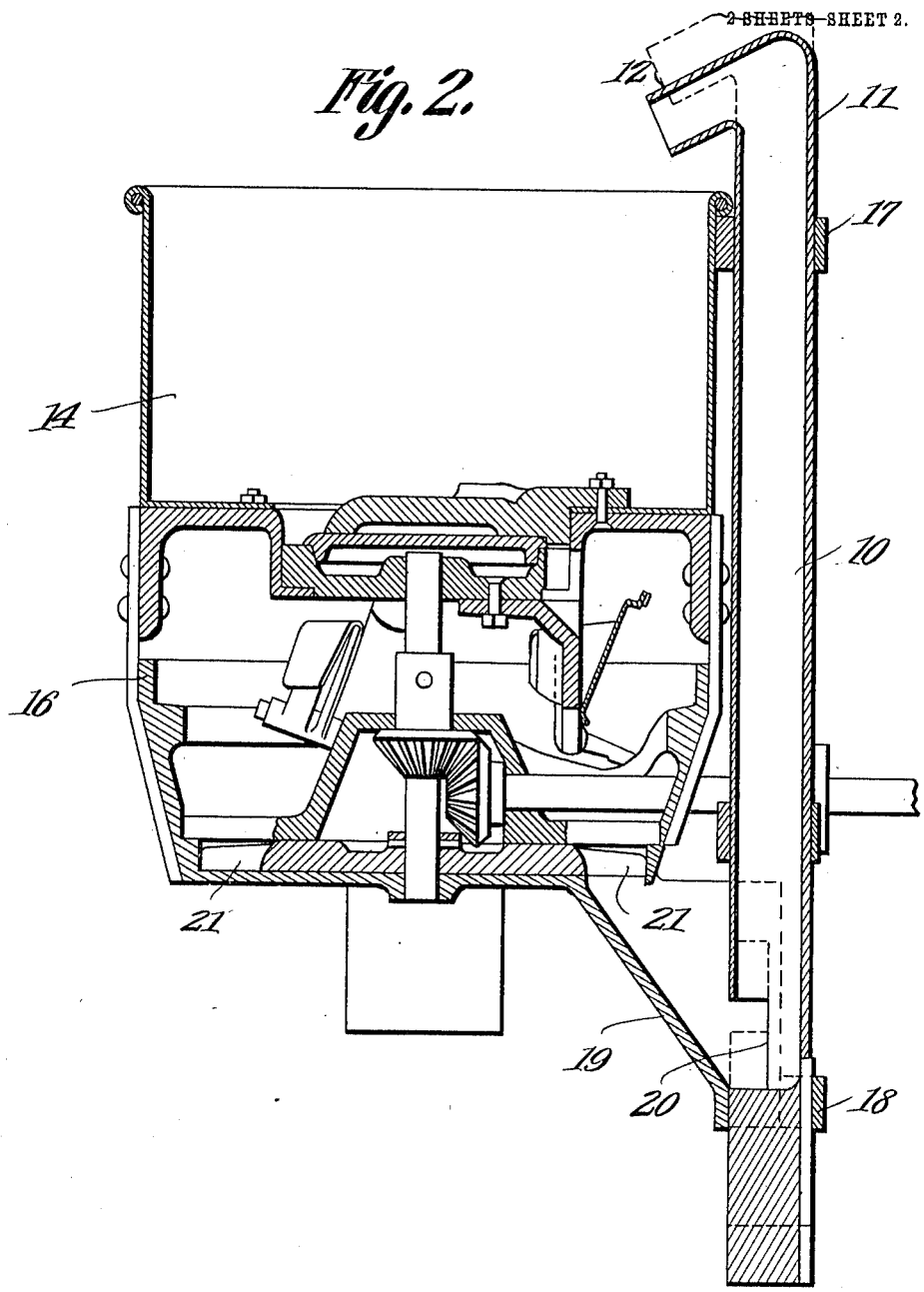

JOHN ALBERT ANDERSON, OF GENESEO, ILLINOIS.

GRAIN-TRANSFER MECHANISM FOR PLANTERS.

1,063,902.  Specification of Letters Patent. Patented June 3, 1913.

Application filed August 21, 1911. Serial No. 645,121.

*To all whom it may concern:*

Be it known that I, JOHN A. ANDERSON, a citizen of the United States, residing at Geneseo, in the county of Henry and State of Illinois, have invented a new and useful Grain-Transfer Mechanism for Planters, of which the following is a specification.

This invention relates to an improvement in grain transfer mechanisms.

The primary object of the present invention is to provide a simple and efficient grain transferring mechanism for transferring the grain from one hopper of a planter to another.

The present invention is an improvement on the transfer mechanism shown in Patent 911,691 granted February 9, 1909. In that patent a main hopper is shown said hopper being arranged above a delivery hopper, a grain sorting mechanism being interposed between the two hoppers. Grain is deposited within the first hopper and the selecting mechanism receives the grain and deposits a portion of the same within a suitable chute, the portion of the grain which is rejected by the selecting mechanism being returned to the other hopper. The grain is then conveyed by means of a conveyer back to the delivery hopper, a rotary wiper being arranged within the second hopper to return the rejected grain to the conveyer. The arrangement of the hoppers and the construction of the grain selecting mechanism is substantially the same as that shown in the above mentioned patent, this invention as before stated being an improvement in the elevating mechanism.

In the drawings:—Figure 1 is a side elevation of the elevating mechanism. Fig. 2 is a section taken on the line 2—2 of Fig. 1.

In the drawings 10 designates a vertically disposed tube the upper end 11 of which is provided with a spout 12 arranged to communicate with the upper hopper 14. A sleeve 17 is secured to the upper hopper and supports the tube at a point adjacent its upper end, a sleeve 18 supporting the same adjacent its lower end. The lower hopper 16 is provided with a chute 19 to which the lower sleeve 18 may be secured or with which said sleeve may be formed integral, said chute registering with an opening 20 formed in the tube 10, the tube being solid below this point. It will thus be noted that the rejected grain deposited within the grain hopper 16 will be conducted by means of the wipers 21 which rotate with the selecting mechanism into the chute 19 and to the tube 10. Secured to one of the extensions 22 of the sleeve 17 is a coiled spring 23, the other end of which is connected to the lower end of the tube 10, the tendency of the said spring being to hold the tube in its extended upper position. Secured to the sleeve 18 is a spring 25 which is provided with an elongated loop 26 which passes through an eye 27 secured to the tube. Arranged centrally on the tube is a collar 28 which is provided with a projection 28′ which is in the path of a cam 29 arranged on the shaft 30, this cam being of a configuration which will depress the tube through its contact with the projection twice during each revolution of the shaft. Thus it will be noted that when the cam forces the tube downward the same will be returned to its normal position by means of the spring 23, the spring 25 preventing the same from participating in too great an upward movement. As the tube is pressed downward the spring 25 will not be disturbed, the eye sliding in the loop 26. This peculiar manner of mounting the tube causes the same to vibrate as the shaft 30 is rotated. The rejected grain is being constantly deposited within the tube and the vibration of said tube will feed the same toward the spout 12, the grain being deposited within the hopper 14. As the grain within the tube is forced upward, a certain quantity is projected through the spout. While this grain is projected through the spout, the entire "stack" of grain is forced upward leaving a space at the bottom of the tube, which space is filled by a fresh supply of grain from the lower hopper. Thus the upward movement of the stack projects a certain quantity of the grain within the upper hopper, the space left within the tube by the removal of said grain being filled from the lower hopper.

The many advantages of a transfer mechanism of this character will be clearly apparent as it will be seen that the same will effectually convey the grain from one hopper to the other, attention being called to the fact that the same may be used in connection with planters, other than that illustrated in the drawings. It will also be seen that the structure is such as may be easily and economically manufactured and the various parts readily assembled.

What is claimed is:—

1. In a conveying mechanism, a plurality of hoppers arranged one above the other, a tube one end of which is closed supported for vertical movement by said hoppers and means for vibrating said tube to transfer material from one hopper to the other, said means imparting a more rapid movement to the tube in one direction than in the other.

2. In a conveying mechanism, a tube one end of which is closed supported for vertical movement, said tube being in communication with a plurality of hoppers and means for causing said tube to vibrate to transfer the material from one of said hoppers to the other, said means imparting a more rapid movement to the tube in one direction than in the other.

3. In a conveying mechanism, a plurality of hoppers arranged one above the other, a tube one end of which is closed supported for vertical movement by said hoppers, a resilient connection between the upper hopper and the lower end of said tube, a resilient connection between said tube and the lower hopper and means for imparting vertical movement to said tube.

4. In a conveying mechanism, a plurality of hoppers arranged one above the other, a sleeve secured to each of said hoppers, a tube one end of which is closed supported for movement by said sleeves, a collar secured to said tube, a projection on said collar, a shaft, a cam mounted on said shaft and a resilient connection between said tube and said hoppers.

5. In a conveying mechanism, a plurality of hoppers arranged one above the other, sleeves supported by said hoppers, a tube one end of which is closed supported for movement by said sleeves, a resilient connection between the upper hopper and the lower end of said tube, a resilient connection between the lower hopper and said means for imparting movement to said sleeve, said last mentioned connection being active only during the movement of the sleeve in one direction.

6. In a conveying mechanism, a plurality of hoppers arranged one above the other, a sleeve supported by each of said hoppers, a tube one end of which is closed supported for movement by said sleeves, a spring having one of its ends secured to the upper hopper and the other to the lower end of said tube, a spring having one of its ends secured to the sleeve supported by the lower hopper, the other end of said spring terminating in an elongated loop, an eye supported by the tube, the looped end of said spring passing through said eye and means for imparting movement to said tube.

7. In a conveying mechanism, upper and lower hoppers, an upwardly extending tube closed at its lower end and communicating adjacent said end with the lower hopper and at its upper end with the upper hopper, yielding means for holding the tube normally elevated, and means for gradually lowering the tube against the stress of said yielding means and suddenly releasing it.

8. In a conveying mechanism, the combination with an upper and a lower hopper, of a tube communicating adjacent its lower end with the lower hopper and at its upper end with the upper hopper, the lower end of the tube being closed, and separate means for gradually lowering the tube into communication with the lower hopper and quickly releasing the tube successively to feed material upwardly within the tube into the upper hopper.

In testimony that I claim the foregoing as my own, I have hereto affixed my signature in the presence of two witnesses.

JOHN ALBERT ANDERSON.

Witnesses:
 CHAS. M. MORTON,
 C. L. NELSON.

---

Copies of this patent may be obtained for five cents each, by addressing the "Commissioner of Patents, Washington, D. C."